(12) United States Patent
Cannon et al.

(10) Patent No.: US 6,453,017 B1
(45) Date of Patent: Sep. 17, 2002

(54) EXTENDED OFF-HOOK NOTIFICATION VIA ELECTRONIC COMMUNICATIONS

(75) Inventors: Joseph M. Cannon, Harleysville; James A. Johanson, Macungie, both of PA (US)

(73) Assignee: Agere Systems Guardian Corp., Orlando, FL (US)

(*) Notice: Subject to any disclaimer, the term of this patent is extended or adjusted under 35 U.S.C. 154(b) by 0 days.

(21) Appl. No.: 09/325,632

(22) Filed: Jun. 4, 1999

(51) Int. Cl.[7] .................................................. H04M 1/24
(52) U.S. Cl. .............................. 379/29.07; 379/211.02
(58) Field of Search ........................... 379/27.01, 29.01, 379/29.07, 32.01, 102.01, 102.02, 106.02, 133, 211.02

(56) References Cited

U.S. PATENT DOCUMENTS 5,197,096 A * 3/1993 Sakuma et al. ......... 379/201 X
5,978,470 A * 11/1999 Shaffer et al. ............... 379/377

* cited by examiner

Primary Examiner—Creighton Smith
(74) Attorney, Agent, or Firm—William H. Bollman

(57) ABSTRACT

Apparatus and method to generate an alternative receiver off-hook (AROH) notification signal to a user of a telephone system suffering from an extended off-hook condition. The alternative receiver off-hook notification signal may be, e.g., an e-mail message sent to a preferred e-mail address, a paging message sent to a preferred pager number, a facsimile message sent to a preferred facsimile machine, and/or an audible message sent to a preferred alternative telephone. More than one alternative receiver off-hook notification device may be used, and are preferably prioritized such that as one notification device fails to rectify the off-hook condition, the next priority notification device will be utilized after a suitable delay. Thus, the user of the telephone system can receive notification of the off-hook condition of their telephone system even when not within an audible or visual distance of the telephone system.

24 Claims, 6 Drawing Sheets

EXTENDED OFF-HOOK NOTIFICATION VIA ELECTRONIC COMMUNICATIONS

BACKGROUND OF THE INVENTION

1. Field of the Invention

This invention relates generally to the prevention of an undesirable extended off-hook condition of a telephone line by customer premises equipment. More particularly, it relates to the presentation of an improved off-hook notification signal to a telephone line in an off-hook condition.

2. Background of Related Art

At various times, a telephone line may be inadvertently placed in an off-hook condition for an extended period of time even when the telephone line is not in an established telephone call. For instance, the receiver may not be properly returned to the cradle of the telephone system after a telephone call, or a handset may be accidentally dislodged from the cradle of its telephone system or base unit, etc. When in an off-hook condition, the telephone line is typically incapacitated because, e.g., it is not able to audibly ring the telephone when a new incoming call is received. Thus, it is desirable to have the user of the telephone correct the problem, e.g., physically hand up the handset to avoid lost incoming calls.

When an extended off-hook condition occurs, the telephone company central office conventionally sends a high energy receiver off-hook (ROH) notification signal to the telephone line. Presumably, the off-hook handset or speaker will output the received high energy ROH signal as a loud audible tone. If the user of the telephone line is within an audible distance of the off-hook receiver, they will presumably hear the receiver off-hook notification signal, recognize the problem, and subsequently return the off-hook receiver into its proper place to return the telephone line to an on-hook condition. If the user of the telephone line is not within an audible distance of the off-hook receiver, the telephone line will remain in an off-hook condition until noticed at a later time by the user. Typically, the audible ROH tone is terminated after a predetermined amount of time, and the telephone line may be temporarily disconnected at the central office until the off-hook condition is corrected.

FIG. 6 illustrates a conventional telephone system capable of receiving a receiver off-hook (ROH) notification signal from the telephone company central office.

In particular, in FIG. 6, a telephone system 11 is connected to a telephone company central office 13 via a telephone line 15. The telephone company central office 13 is typically considered to be a part of the public switched telephone network 17.

The telephone system 11 includes a telephone base unit 19 having a cradle 21 for receiving a handset 23. When the handset 23 is properly placed in the cradle 21, a switch in the telephone notifies a telephone line interface in the telephone system 11 to place the telephone line in an on-hook condition. In an on-hook condition the telephone system 11 is capable of receiving an incoming telephone call (and of placing an outgoing telephone call) over the telephone line 15.

If the handset 23 is inadvertently displaced or otherwise removed from the cradle 21 of the telephone base unit 19 of the telephone system 11 for an extended period of time when the telephone system 11 is not in use, the telephone company central office 13 will detect such an off-hook condition and recognize that the telephone system 11 is not in an established telephone call. Thus, in an attempt to notify the user to rectify the situation, the central office 13 will output a receiver off-hook (ROH) notification signal to the telephone line 15 for audible and/or visual display at the off-hook telephone system 11. The receiver off-hook notification signal can be audibly heard (and/or visually observed using an appropriate display) to a user within an audible and/or visual distance of the handset 23.

Unfortunately, many times a user is no longer within an audible distance of the handset 23 when the receiver off-hook (ROH) notification signal is finally presented by the telephone company central office 13 over the telephone line 15. For instance, the user may have been on their way out of the house to drive to the office as soon as they completed the last telephone call using the offending telephone system 11, and may no longer be in the house when the receiver off-hook (ROH) notification signal is finally transmitted by the central office 13 to the user's off-hook telephone system 11. Thus, since the user is not within an audible and/or visual distance of the handset 23 when the receiver off-hook (ROH) signal is received, they will likely not realize that the handset 23 is in an off-hook condition. As a result, the user will then not be able to receive incoming telephone calls over the telephone line 15 or to record incoming voice messages on an appropriate voice messaging system. Many hours of telephone calls may be lost due to the inadvertent off-hook condition of the telephone system 11. Another disadvantage is that the status of the called telephone line is unknown to the caller when receiving a busy signal.

Accordingly, there exists a need for an apparatus and method which allows a telephone company central office to present an improved receiver off-hook (ROH) notification signal which can be heard or viewed by the user even when the user is not in the vicinity of the offending off-hook telephone system.

SUMMARY OF THE INVENTION

In accordance with the principles of the present invention, a receiver off-hook notifier comprises an alternative receiver off-hook device adapted to output an automated message to a user of an off-hook telephone system over an alternative communication path to an alternative device other than the telephone system. An identifier module is adapted to contain at least one entry corresponding to the alternative communication path to the user.

A method for notifying a user of a telephone line being in an off-hook condition in accordance with another aspect of the present invention comprises presenting a high energy receiver off-hook signal to the telephone line, and sending an alternative receiver off-hook notification signal to an alternative communication device other than over the telephone line.

Additionally, a method for contacting a user of a telephone line in an off-hook condition in accordance with yet another aspect of the present invention comprises detecting a receiver off-hook condition at a telephone line of the user, and re-routing an incoming telephone call to the telephone line to an alternative telephone line pre-designated by the user.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides an apparatus and method which allows a telephone company central office to notify a user of an off-hook condition at their telephone system using an alternative communication device, e.g., via e-mail message, pager message, facsimile message, automated telephone call to an alternative telephone number, etc. The alternative receiver off-hook (AROH) notification message can be generated in addition or alternatively to the otherwise conventional audible receiver off-hook (ROH) signal transmitted to the offending telephone system. Thus, by receiving the alternative receiver off-hook signal, a user of an off-hook telephone system can receive notification of the off-hook condition of their telephone system and have the opportunity to rectify the condition before a significant number of incoming telephone calls are lost-even if the user is not within an audible or visual distance of the offending telephone system.

In particular, when a handset (receiver) of a telephone system is inadvertently left in an off-hook condition for an extended period of time, the telephone company central office will conventionally send a receiver off-hook (ROH) notification signal over the telephone line to the offending telephone system. However, in accordance with the principles of the present invention, the telephone company central office will alternatively or additionally notify the user using one or more pre-selected communication devices (e.g., e-mail, pager, facsimile, alternative telephone, etc.) using a predetermined address (e.g., e-mail address, pager telephone number, facsimile telephone number, or alternative telephone number, respectively). Preferably, the alternative receiver off-hook (AROH) message will inform the user that their telephone line has been left in an off-hook condition for an extended period of time, thereby providing the user the opportunity to return the telephone line to an on-hook condition at the soonest time most convenient to them. Alternative notification communication devices within the scope of the present invention include, but are not limited to, e-mail message, facsimile message, pager notification, telephone voice message, etc.

Figure 1:
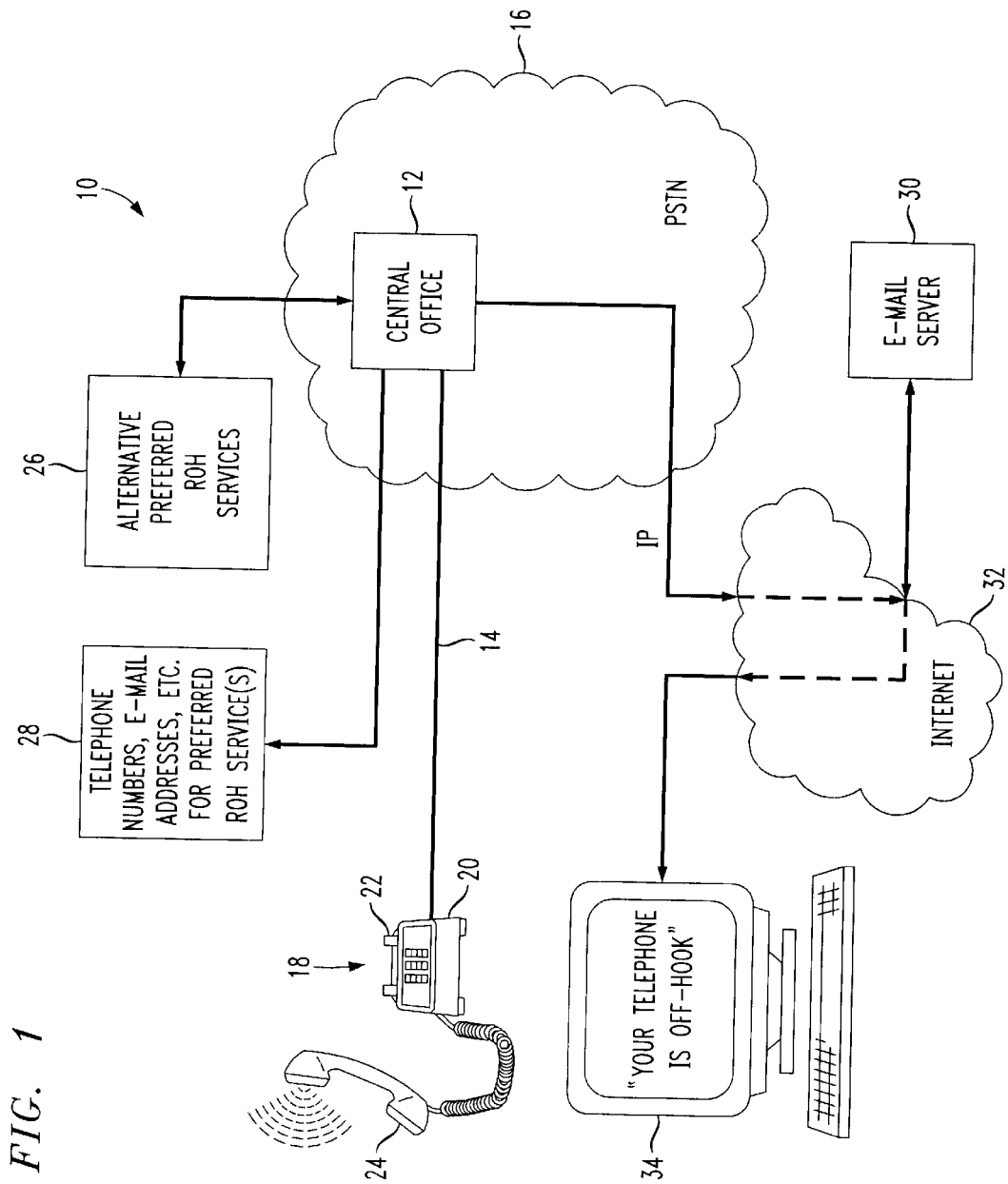
FIG. 1 illustrates an embodiment of an apparatus and method which allows a telephone company central office to notify a user of an off-hook condition via alternative communications methods, e.g., via e-mail notification over the Internet, via automated telephone call to an alternative number (e.g., the office number), etc., in accordance with the principles of the present invention.

FIG. 1 illustrates an exemplary embodiment of apparatus 10 which allows a telephone company central office 12 to present both an otherwise conventional receiver off-hook (ROH) notification signal to a telephone line 14 in an off-hook condition, and to also notify a user of the off-hook condition via, e.g., an e-mail message. In accordance with the principles of the present invention, the alternative receiver off-hook (AROH) signal may be transmitted to the alternative communication device after the more conventional audible receiver off-hook (ROH) signal fails to allow the user to rectify the off-hook condition.

In particular, in FIG. 1, a telephone system 18 is interconnected to a telephone company central office 12 through a telephone line 14. The telephone company central office forms a part of the public switched telephone network (PSTN) 16. The telephone system 18 includes a base unit 20 having a cradle 22 for receiving a handset 24. When the handset 24 is properly positioned within the cradle 22, the telephone line 14 is placed in an on-hook condition by an appropriate telephone line interface in the telephone system 18. In an on-hook condition, the telephone system 18 is capable of receiving incoming telephone calls and of allowing a suitable voice messaging system (e.g., a telephone answering device) utilizing the same telephone line 14 to record voice messages from incoming callers.

If the telephone system 18 is not in use but its handset 24 is left off the cradle 22 for an extended period of time, the telephone company central office 12 will typically present an audible receiver off-hook (ROH) notification signal over the telephone line 14 to be audibly output by the speaker of the handset 24.

Importantly, the present invention further includes an apparatus and method which allows the telephone company central office 12 to notify the user of an extended off-hook condition at an alternative communication device. Thus, even if the user is not within audible or visual proximity to the off-hook, offending telephone system 18, the user can still be notified at one or more alternative communication devices using one or more alternative communication messaging techniques.

As illustrated in FIG. 1, the telephone company central office 12 includes an alternative preferred receiver off-hook (ROH) services module 26, and an associated list of telephone numbers, e-mail addresses, etc. to be used by the one or more preferred receiver off-hook (ROH) alternative communication device set in the alternative preferred ROH service module 26.

The user of the telephone system 18 can pre-establish with their servicing telephone company central office 12 their preferred alternative receiver off-hook (AROH) notification device, and the address or telephone number to be used by that alternative notification device. In response, the central office 12 will establish an appropriate entry of the preferred alternative receiver off-hook (AROH) notification device(s) in the alternative preferred ROH services module 26, and establish an appropriate entry of the e-mail address or telephone number to be used for such preferred devices in the directory module 28. As discussed above, the alternative notification devices can include, for example, e-mail system, a facsimile system, a pager system, and/or an alternative telephone system to be called.

Figure 3:
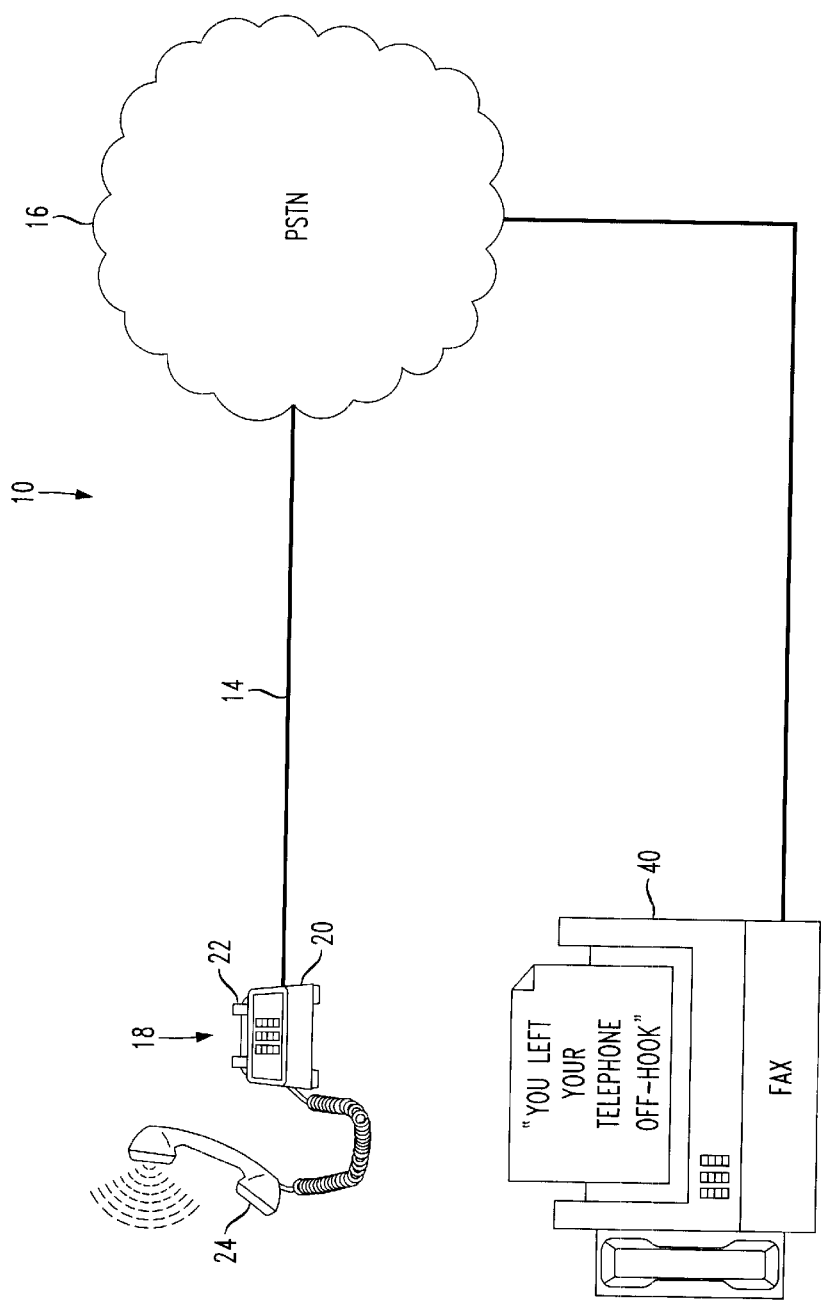
FIG. 3 illustrates another exemplary embodiment of an apparatus and method which allows a telephone company central office to notify a user of an off-hook condition via a facsimile message, in accordance with the principles of the present invention.
Figure 4:
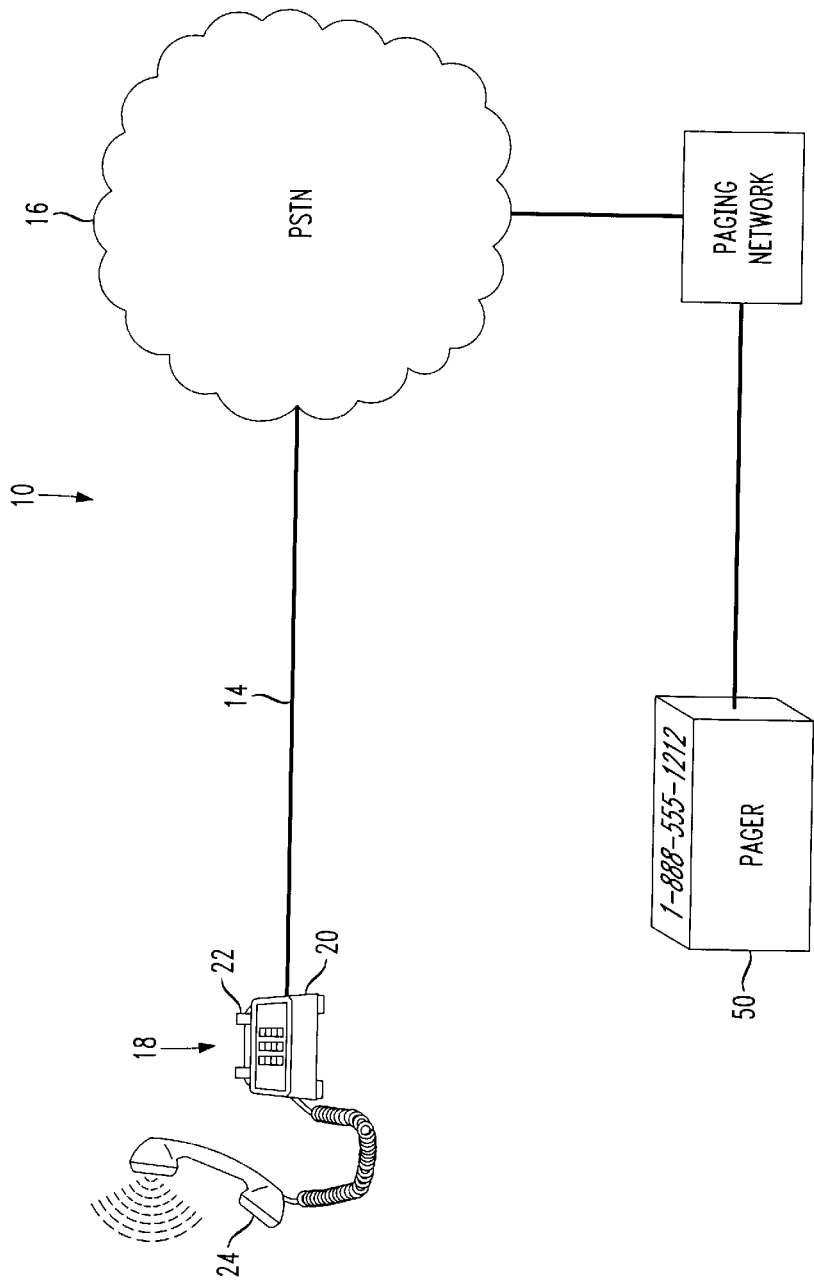
FIG. 4 illustrates yet another exemplary embodiment of an apparatus and method which allows a telephone company central office to notify a user of an off-hook condition via pager notification, in accordance with the principles of the present invention.
Figure 5:
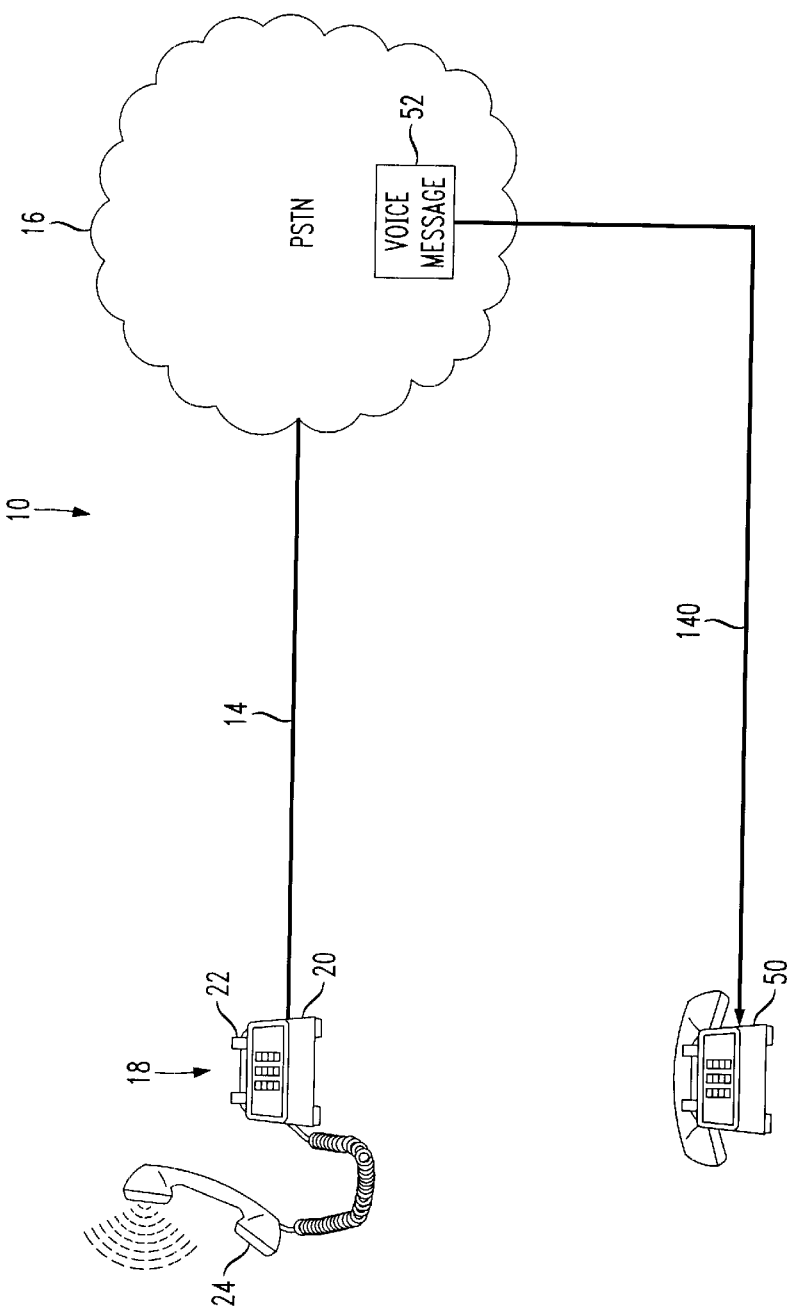
FIG. 5 illustrates yet another exemplary embodiment of an apparatus and method which allows a telephone company central office to notify a user of an off-hook condition via an automated telephone voice message to a different telephone system, in accordance with the principles of the present invention.
Figure 6:
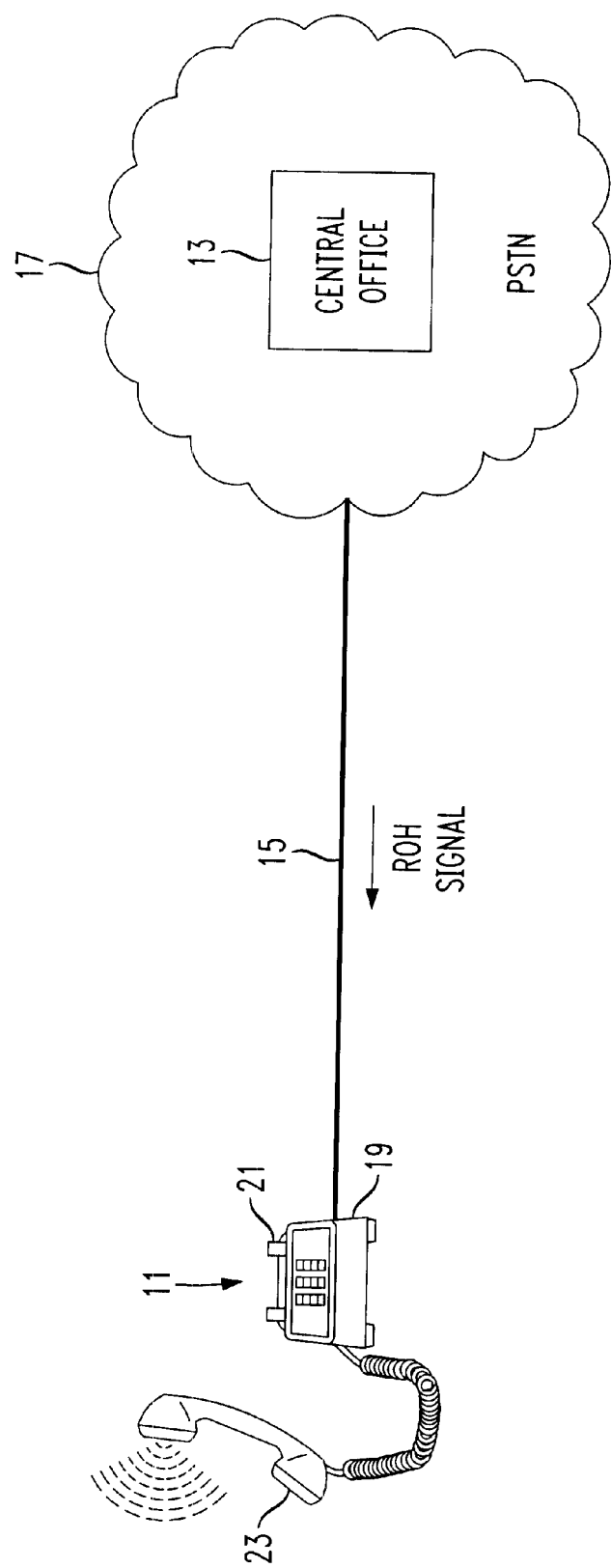
FIG. 6 illustrates a conventional telephone system which is capable of receiving a conventional high energy receiver off-hook (ROH) notification signal over a telephone line from a telephone company central office.

FIG. 1 shows an e-mail server providing the preferred alternative notification device. In FIG. 1, the alternative notification device is an e-mail server to provide the user with an automated e-mail message to the user's predetermined e-mail address such as "YOUR HOME TELEPHONE IS OFF-HOOK". As will be discussed in more detail later, FIG. 3 shows the exemplary use of a facsimile machine to serve as an alternative notification device, FIG. 4 shows the exemplary use of a pager to serve as an alternative notification device, and FIG. 5 shows the exemplary use of an alternative telephone as an alternative notification device.

In operation, either significantly after or substantially at the same time that the telephone company central office 12 presents a receiver off-hook (ROH) notification signal to an offending off-hook telephone line 14, the telephone company central office 12 will also send, e.g., an e-mail message to the user at a predetermined e-mail mailbox at an appropriate e-mail server 30 over the Internet 32. The e-mail notification message sent by the telephone company central office 12 is preferably properly addressed with the appropriate Internet Protocol (IP) address for the user's e-mail server 30.

The user can retrieve the e-mail message in their normal course of business, e.g., when they get to the office, when they get settled in a hotel on a business trip, etc. The user can retrieve the automated alternative receiver off-hook e-mail message using any appropriate device, e.g., using a computer 34 as shown, or alternatively using Web TV™ on a properly equipped television set, using a personal data apparatus (PDA) such as a Palm Pilot™, or other suitable device for receiving e-mail messages.

Figure 2:
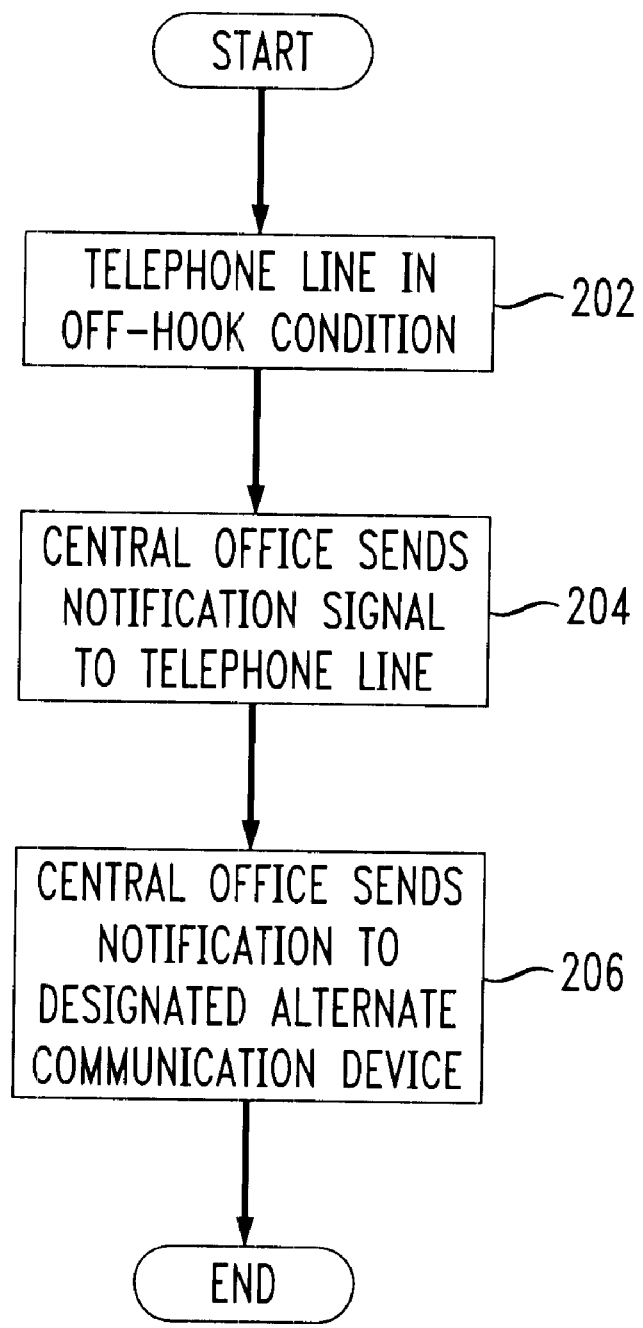
FIG. 2 is a flow chart illustrating an exemplary process by which a telephone company central office notifies a user of an off-hook condition using an alternative communication device other than via the off-hook telephone line, in accordance with the principles of the present invention.

The general operation of the alternative receiver off-hook (AROH) notification signal is. shown in FIG. 2.

In particular, in FIG. 2, a user inadvertently leaves his or her telephone line 14 in an off-hook condition in step 202.

In step 204, the telephone company central office 12 (or other source location) outputs a receiver off-hook (ROH) notification signal to the user's telephone system 18.

In step 206, particularly if the ROH notification signal fails to rectify the off-hook condition, the telephone company central office 12 or other location will generate an automated message to the user's address or telephone number of their highest priority preferred alternative receiver off-hook (AROH) notification device, e.g., an automated e-mail message, facsimile message, pager message, or telephone voice message.

In another exemplary embodiment of the present invention as shown in FIG. 3, the alternative notification device is a facsimile machine 40 which receives an automated message such as "YOU LEFT YOUR TELEPHONE OFF-HOOK" or the like. The automated facsimile message would be generated by the central office 12, and output after establishment of a telephone call with the user's facsimile machine 40 as selected and designated by the user as a suitable alternative receiver off-hook notification device. As in all disclosed embodiments, the telephone company central office 12 may additionally output the otherwise conventional high energy receiver off-hook (ROH) notification signal to the telephone line 14, either substantially simultaneously with the facsimile message, or preferably significantly before resorting to the use of the alternative facsimile message receiver off-hook notification signal.

In still another exemplary embodiment of the present invention as shown in FIG. 4, the alternative notification means includes notifying the user of the telephone line 14 being in an off-hook condition via a pager device 50. The user designates a predetermined pager number, which is stored at the telephone company central office 12. Then, when the telephone company central office 12 detects an off-hook condition at the user's telephone system (and preferably after an unsuccessful attempt at using the otherwise conventional high energy receiver off-hook (ROH) notification signal to the telephone line 14), the telephone company central office 12 or other location then generates an automated notification page to the designated pager or pagers 50. The pager 50 can be a typical numerical pager as illustrated in FIG. 4, or can be a more sophisticated short message or TEXT pager capable of providing a suitable text message such as "Your telephone at (111) 555-1212 was left off-hook". If a simple numeric pager device 50 is used, the paged telephone number may either represent a "dummy" telephone number which the user will instantly recognize, or may represent the telephone number of customer service or other organization at the telephone company, who will be able to detect and explain the off-hook condition to the user when they call back in response to the paging message.

The alternative notification message may be a simple message indicating an off-hook condition in general, or may include more detailed information such as the telephone number of the telephone line which was left in an off-hook condition, and/or the time/date at which the telephone line was left in an off-hook condition, etc.

In yet another embodiment of the present invention as shown in FIG. 5, the alternative notification device is a different telephone line 140 which is automatically called by a suitable module at the central office 12. With such a system, the user designates a predetermined telephone number to be used in the event of an extended off-hook condition. The alternative telephone number is stored for access by the telephone company central office 12. Then, if a high energy receiver off-hook (ROH) notification signal to the off-hook telephone line 14 fails to rectify the off-hook condition, then the telephone company central office 12 will automatically dial the alternative telephone number. When the user answers the alternative telephone system 60, an automated voice message 52 is output by a suitable playback module at the central office 12 to output an audible message, e.g., "Your telephone at (111) 555-1212 was left off-hook", to the user.

It should be noted that the user may provide preferred methods, e.g., e-mail, facsimile, pager, and/or telephone voice message, for alternative receiver off-hook notification, and the preferred methods and/or addresses, e.g., telephone numbers or e-mail addresses for those preferred methods. The user may rank the alternative methods in a priority order, and the central office may utilize the preferred alternative notification devices in order of priority until the off-hook condition is rectified. Moreover, a reasonable amount of time may be established by default or set to allow suitable time for a particular alternative notification device to be successful. For instance, a new alternative notification device may be utilized each hour, each day, etc., working down the priority list of preferred alternative notification devices.

Furthermore, it is with the principles of the present invention to allow a user to change the preferred methods and/or telephone numbers for those preferred methods, e.g., by calling a special telephone number connected to the central office 12 and, e.g., by selecting suitable menu selections in response to an automated selection application program.

In the case of a telephone controller which has control of its own switch hook, e.g., in a cordless telephone, the receiver off-hook (ROH) signal can be detected by the controller and automatically hung up after an appropriate amount of time without voice activity, e.g., after 1 minute, 5 minutes, etc.

Also, in accordance with the principles of the present invention, with knowledge of an alternative telephone number of a user, an incoming telephone call to a telephone in a receiver off-hook (ROH) condition can be automatically re-routed by the central office to the alternative telephone number.

While the invention has been described with reference to the exemplary embodiments thereof, those skilled in the art will be able to make various modifications to the described embodiments of the invention without departing from the true spirit and scope of the invention.

What is claimed is:

1. A receiver off-hook notifier, comprising:
    an alternative receiver off-hook device adapted to output an automated message to a user of an off-hook telephone system over an alternative communication path to an alternative device other than said telephone system; and
    an identifier module adapted to contain at least one entry corresponding to said alternative communication path to said user.

2. The receiver off-hook notifier according to claim 1, wherein:
    said alternative device is an e-mail server.

3. The receiver off-hook notifier according to claim 1, wherein:
    said alternative device is a facsimile machine.

4. The receiver off-hook notifier according to claim 1, wherein:
    said alternative device is a pager.

5. The receiver off-hook notifier according to claim 1, wherein:
    said alternative device is another telephone system.

6. The receiver off-hook notifier according to claim 1, further comprising:
    a high energy receiver off-hook tone generator adapted to output a high energy tone signal to said off-hook telephone system over a telephone line.

7. The receiver off-hook notifier according to claim 1, wherein:
    said receiver off-hook notifier is adapted to be installed in association with a telephone company central office.

8. A method for notifying a user of a telephone line being in an off-hook condition, comprising:
    presenting a high energy receiver off-hook signal to said telephone line; and
    sending an alternative receiver off-hook notification signal to an alternative communication device other than over said telephone line.

9. The method for notifying a user of a telephone line being in an off-hook condition according to claim 8, further comprising:
    generating a text message for presentation to said user at said alternative communication device.

10. The method for notifying a user of a telephone line being in an off-hook condition according to claim 8, further comprising:
    generating a verbal message for presentation to said user at said alternative communication device.

11. The method for notifying a user of a telephone line being in an off-hook condition according to claim 8, wherein said sending step comprises:
    sending an e-mail message to said user indicating that said telephone line is in an off-hook condition.

12. The method for notifying a user of a telephone line being in an off-hook condition according to claim 8, wherein said sending step comprises:
    sending a pager message to said user indicating that said telephone line is in an off-hook condition.

13. The method for notifying a user of a telephone line being in an off-hook condition according to claim 8, wherein said sending step comprises:
    sending a facsimile message to said user indicating that said telephone line is in an off-hook condition.

14. The method for notifying a user of a telephone line being in an off-hook condition according to claim 8, wherein said sending step comprises:
    sending a verbal message to said user over another telephone line indicating that said telephone line is in an off-hook condition.

15. The method for notifying a user of a telephone line being in an off-hook condition according to claim 8, further comprising:
    sending another alternative receiver off-hook notification signal to another alternative communication device other than. over said telephone line.

16. Apparatus for notifying a user of a telephone line being in an off-hook condition, comprising:
    means for presenting a high energy receiver off-hook signal to said telephone line; and
    means for sending an alternative receiver off-hook notification signal to an alternative communication device other than over said telephone line.

17. The apparatus for notifying a user of a telephone line being in an off-hook condition according to claim 16, further comprising:
    means for generating a text message for presentation to said user at said alternative communication device.

18. The apparatus for notifying a user of a telephone line being in an off-hook condition according to claim 16, further comprising:
    means for generating a verbal message for presentation to said user at said alternative communication device.

19. The apparatus for notifying a user of a telephone line being in an off-hook condition according to claim 16, wherein said means for sending comprises:
    means for sending an e-mail message to said user indicating that said telephone line is in an off-hook condition.

20. The apparatus for notifying a user of a telephone line being in an off-hook condition according to claim 16, wherein said means for sending comprises:
    means for sending a pager message to said user indicating that said telephone line is in an off-hook condition.

21. The apparatus for notifying a user of a telephone line being in an off-hook condition according to claim 16, wherein said means for sending comprises:
    means for sending a facsimile message to said user indicating that said telephone line is in an off-hook condition.

22. The apparatus for notifying a user of a telephone line being in an off-hook condition according to claim 16, wherein said means for sending comprises:
    means for sending a verbal message to said user over another telephone line indicating that said telephone line is in an off-hook condition.

23. The apparatus for notifying a user of a telephone line being in an off-hook condition according to claim 16, further comprising:

means for sending another alternative receiver off-hook notification signal to another alternative communication device other than over said telephone line.

24. A method for contacting a user of a telephone line in an off-hook condition, comprising:

detecting a receiver off-hook condition at a telephone line of said user; and re-routing an incoming telephone call to said telephone line to an alternative telephone line pre-designated by said user.

\* \* \* \* \*